United States Patent [19]

Brown

[11] Patent Number: 4,615,123

[45] Date of Patent: Oct. 7, 1986

[54] APPARATUS FOR THE CONTINUOUS TREATMENT OF SOLID PARTICLES IN A FLUIDIZED STATE

[76] Inventor: Ernest C. Brown, 19 Ledgewood Dr., Danvers, Mass. 01923

[21] Appl. No.: 674,276

[22] Filed: Nov. 23, 1984

[51] Int. Cl.⁴ ............................................. F26B 17/10
[52] U.S. Cl. ................................. 34/57 A; 34/57 E; 432/58
[58] Field of Search ...................... 34/57 A, 57 E, 160; 432/15, 58; 406/88, 92

[56] References Cited

U.S. PATENT DOCUMENTS

3,398,466  8/1968  Brown .................................. 34/160
4,201,499  5/1980  Buske et al. ........................ 34/57 A
4,292,745  10/1981  Caratsch .............................. 34/160

*Primary Examiner*—Larry I. Schwartz
*Attorney, Agent, or Firm*—Herbert L. Gatewood

[57] ABSTRACT

A nozzle assembly is provided for use in apparatus for treatment of particulate material wherein the particulate material is conveyed through a treatment zone in fluidized condition, said fluidization being accomplished by a high velocity flow of gas directed against an imperforate member provided by the conveyor which gas flow is discharged from an elongated slot defined by the nozzle assembly and whose lengthwise direction extends in the direction that the particles are conveyed.

29 Claims, 8 Drawing Figures

APPARATUS FOR THE CONTINUOUS TREATMENT OF SOLID PARTICLES IN A FLUIDIZED STATE

BACKGROUND OF THE INVENTION (1) Field of the Invention

This invention relates, in general, to material treatment systems that employ a gaseous medium to fluidize particles in heat exchange or other treating relation More particularly, the invention relates to improved apparatus for bringing the gaseous medium into contact with the particulate material and for fluidizing the particles. Even more particularly, it relates to a nozzle assembly of particular configuration for bringing a gaseous medium into contact with, and for the fluidization of, particulate material.

(2) Description of the Prior Art

Particulate material is advantageously treated by maintaining the particles in fluidized condition as they are transported by a conveyor continuously through a particle treatment zone. Thus, in the food industry, nuts, cocoa beans, grains, and cereals are subjected to roasting, drying or cooling treatments, as desired, and vegetables such as peas and beans are dehydrated. And, plastic and rubber particles, etc. are treated for industrial purposes.

The particles in such treatments are fluidized, in general, by a plurality of gaseous jets which discharge from cylindrical-shaped tubes which extend vertically downwardly toward the imperforate base member of the conveyor, as disclosed in my U.S. Pat. No. 3,060,590, which issued Oct. 30, 1962. Examples of other prior art patents disclosing this manner of fluidization are U.S. Pat. Nos. 3,262,217; 3,398,467; 4,109,394; 4,169,322; and 4,201,499.

Although the particle fluidization and treatment as accomplished in the above-mentioned patents has been found quite satisfactory in at least some cases, the use of such apparatus has not been without some problems in others. The discharge of a gaseous flow from a cylindrical tube extending vertically downwardly is radial, thus resulting in velocity components of equal magnitude around the entire periphery of a tube. The consequence is that gaseous flow from tubes which is directed toward the feed end of the treatment zone rather than the discharge end results in velocity components that tend to retard the forward flow of the particles through the treatment zone. And, that gaseous flow radiating from a tube toward the discharge end of the treatment zone provide velocity components that tend to advance the forward movement of the particles through the treatment zone.

Thus, as a result, those particles which are under the influence of either of these velocity components are in the treatment zone for somewhat different residence times. Some particles are in the treatment zone for a somewhat longer residence time than others and other particles are in the treatment zone for a somewhat lesser time than others. Accordingly, whatever the particular manner of treatment involved, the particles are not treated uniformly. Where the treatment involves drying, for example, some particles are dried more or less than others. And, in the case of certain foods, for example, cereals, such a result is not at all desirable, as it effects the texture and crispness of the flakes of cereal involved.

Another problem involved in the use of particle treatment apparatus such as is disclosed in the above-indicated patents, involves the tube structure per se. These tubes, because of their sizes, e.g., 20" long, $\frac{3}{4}$" I.D., are rather easily damaged, e.g., bent out of shape, or in some cases, even broken off from the tube sheet. This becomes a particlar problem with those nozzle assembles which are removable, and are removed from the treating apparatus from time-to-time.

SUMMARY OF THE INVENTION

The present invention provides improved apparatus for treating particulate material as the particles are advanced continuously through a treatment zone, which apparatus is not attendant with the problems and disadvantages associated with the prior art. In general, the improved apparatus of this invention includes a unique structure for a nozzle assembly for contacting the particulate material with a gaseous flow for fluidization of the particles. The unique feature in the nozzle assembly involves, in its basic aspects, an elongated nozzle from which a gaseous flow is discharged against the imperforate base member of the conveyor, these nozzle assembles being arranged in a row so that the elongated nozzles extend lengthwise in the direction that the particulate material travels through the treatment zone, the nozzles being located intermediate the lateral extremities of the treatment zone.

Quite advantageously, it will be appreciated, the gaseous flow from such an elongated nozzle is primarily lateral, i.e., toward the lateral extremities of the treatment zone on each side of the nozzle, with relatively little, if any, velocity component toward the feed and discharge ends of the treatment zone. Thus, the residence time of the particles in the treatment zone is made more uniform, as this time is not adversely affected by the fluidization of the particles.

In some cases, where the treatment zone is wider, a plurality of rows of elongated nozzle assembles will be provided laterally of the treatment zone. Between each two laterally disposed rows, in such a case, will be provided an elongated vertically disposed divider or particle restraining member which extends the length of the conveyor, resulting in laterally-adjacent conveyor divisions or treatment zones.

The elongated nozzle provided in accordance with the more preferred aspects of the invention will terminate in a rectangular-shaped slot. Nevertheless, it will be appreciated by those skilled in the art that such a slot can be approximated where tubes, of either round or square cross-section, are placed in contact against one another to form a row of tubes, the discharge openings of which are in the same plane. Accordingly, when "rectangular-shaped" slot is used herein, it is intended to mean both such constructions.

BRIEF DESCRIPTION OF THE DRAWING

The features and advantages of the invention will be better appreciated by reference to the drawing, in conjunction with reading the following description thereof as it progresses, in which.

DETAILED DESCRIPTION OF THE INVENTION AND THE PREFERRED EMBODIMENTS

Figure 1:
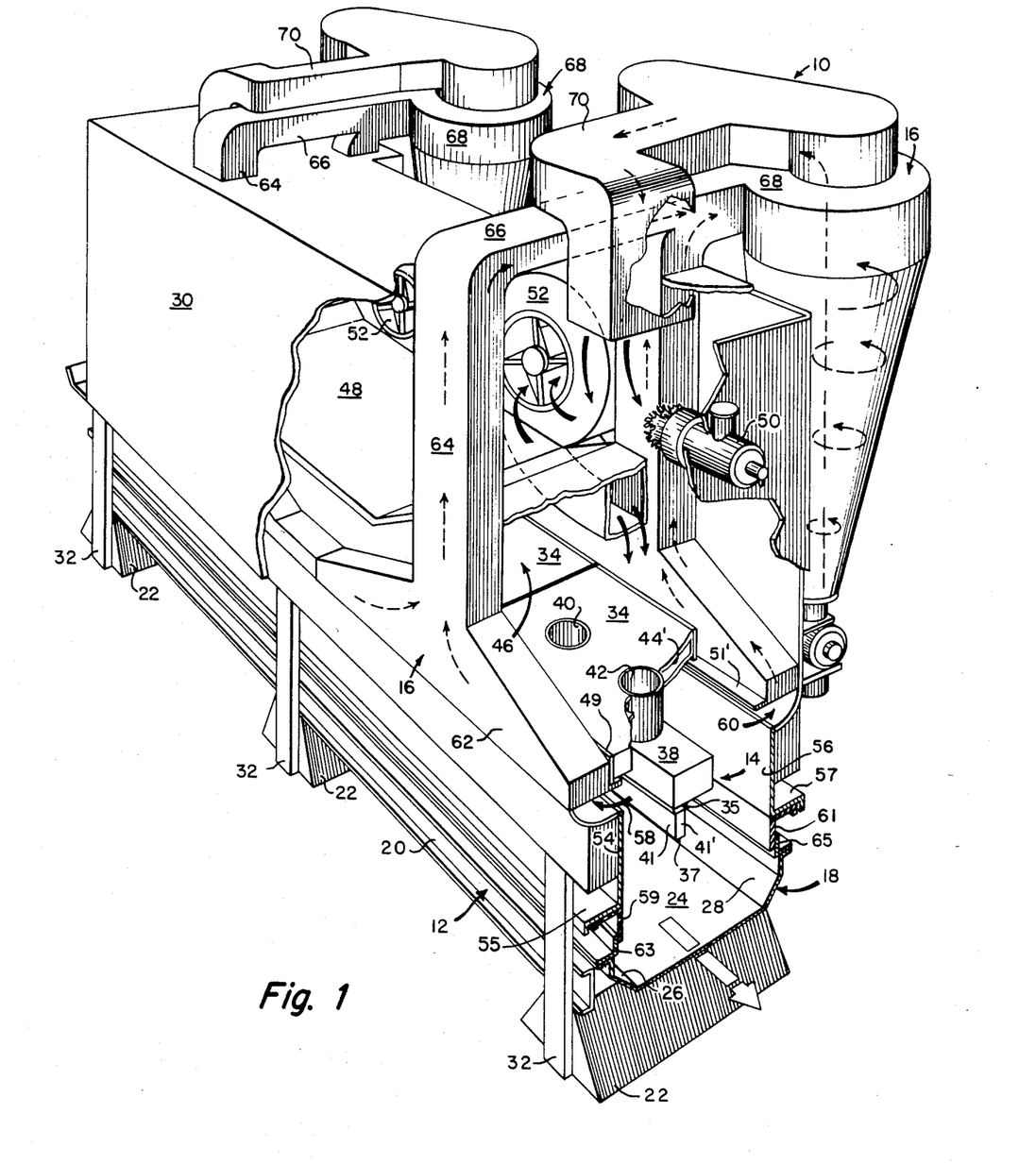
FIG. 1 is a perspective view, partially cut away, of an apparatus for treating particulate material, in accordance with the invention.
Figure 2:
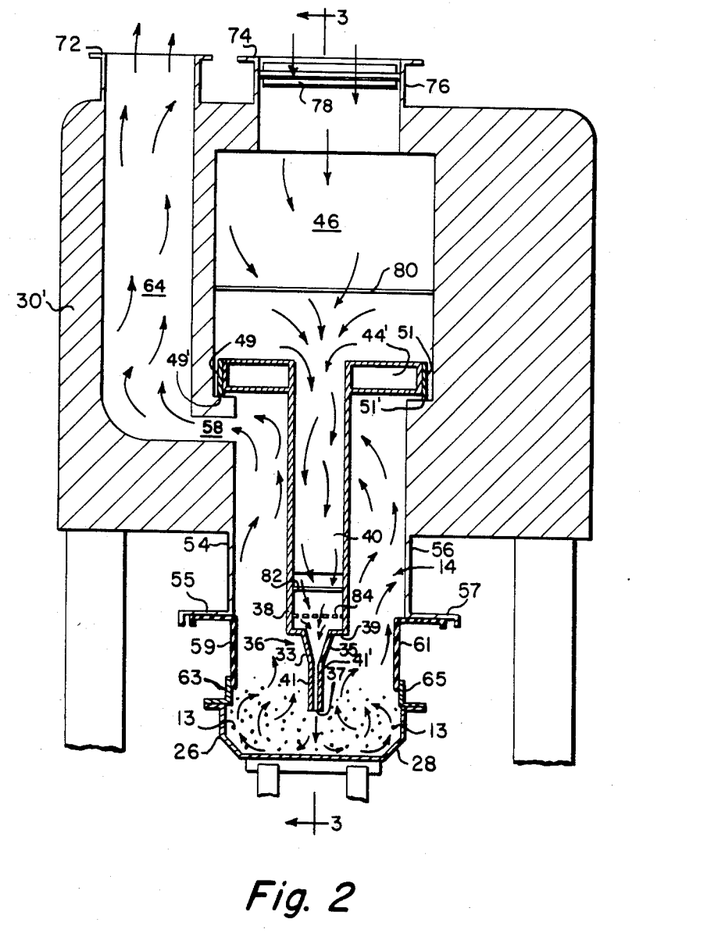
FIG. 2 is a view in cross-section of another embodiment of apparatus, according to the invention, for the treatment of particulate material.
Figure 3:
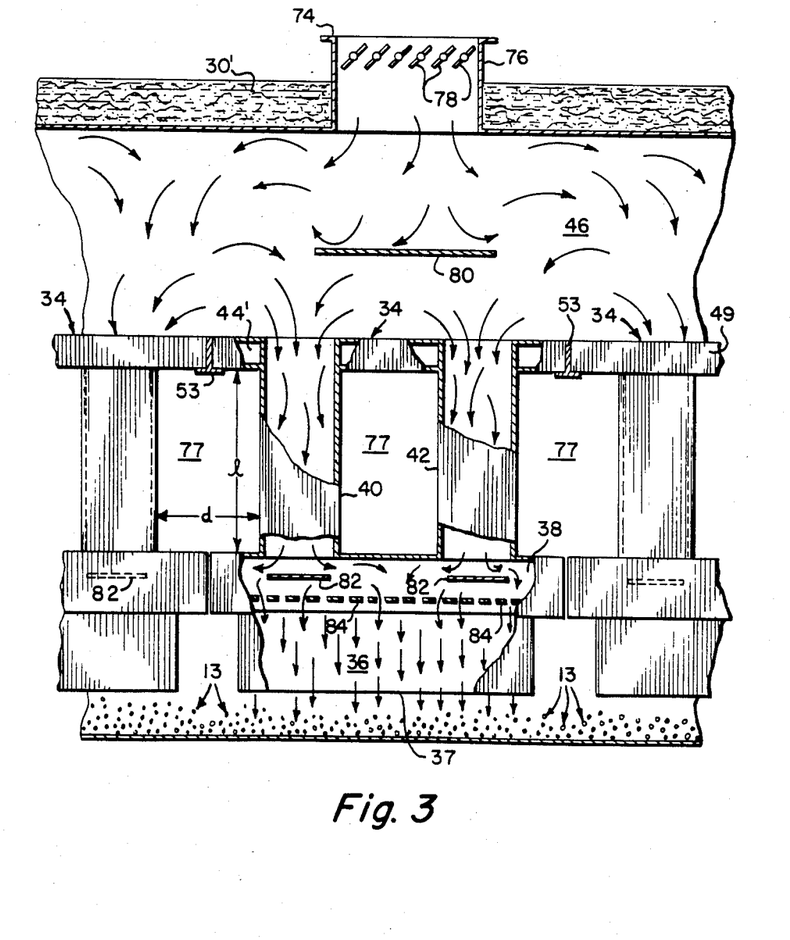
FIG. 3 is a view in section taken at secant lines 3—3 of the apparatus shown in FIG. 2.

Turning now to the drawing there is disclosed in FIG. 1 thereof, apparatus 10 which comprises a particle treating system including a conveyor 12 for transport of particulate material 13 (as shown in FIGS. 2,3) through an elongated treatment zone 14, and a gaseous, e.g., air, flow system 16 that provides a flow of gas for fluidizing the particles being treated, as they are transported by the conveyor 12 through the treatment zone.

The conveyor 12 is a conventional oscillating conveyor comprising a conveyor pan 18 oscillated by a drive mechanism (not shown) which is supported on spaced-apart, parallel longitudinal frame members, according to usual technique, one of which is shown in FIG. 1 as denoted by reference numeral 20. These frame members, which also support conveyor pan 18, are in turn supported by conventional transverse foundation members 22, which may be of concrete. Conveyor pan 18 is defined by horizontally disposed, imperforate, planar base member 24, and vertically inclined side walls 26, 28 on each side thereof, and extending the length of the conveyor pan 18.

The gaseous flow system 16 provides the flow of fluidizing gas, e.g., air, to the particle treatment zone 14 which zone is surmounted over the major portion of its length by insulated housing 30, mounted on vertically disposed conventional supports 32.

Extending vertically downwardly from housing 30 toward the imperforate base member 24 in treatment zone 14 are a plurality of nozzle assemblies 34, arranged in a row (FIG. 3) from the feed end of the conveyor 12 to its discharge end. As is best seen from FIG. 5, each of the nozzle assemblies 34 includes an elongated nozzle 36 terminating in a rectangular-shaped discharge orifice 37, each of which lies in the same horizontal plane in the treatment zone, parallel to that of base member 24. Thus, air or other gas, conditioned previously as desired, is discharged from these elongated nozzles at sufficient velocity to place the particles to be treated in fluidized condition.

Figure 5:
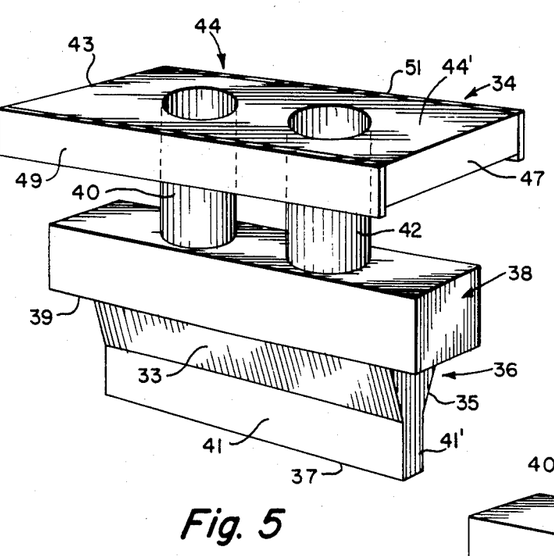
FIG. 5 is a view in perspective showing a removable nozzle assembly according to the invention.

The nozzle assemblies 34, as will be more readily appreciated by reference to FIG. 5, each comprises elongated nozzle 36 integrally connected to an elongated header 38 of somewhat greater length and, as is shown in the drawing, is of a square cross-sectional shape. Connected to header 38 and disposed perpendicular thereto, in spaced-apart locations, adjacent the front and back ends thereof, are cylindrical-shaped header supply tubes 40, 42. These tubes, in turn, are connected to and are integral with horizontally disposed nozzle support member 44, defined by planar horizontal member 44' from which depends vertically downwardly end walls 43, 47, and side walls 49, 51. It will be noted that the side walls 49, 51 extend vertically downwardly a desired distance further than end walls 43, 47, the reason for which will be later disclosed. Although, nozzle header 38 is shown in the drawing to be of square cross-sectional shape, it will be appreciated that such cross-section can be round, if desired, or that the corners can be, at least, rounded. Such a configuation will at least reduce, if not totally eliminate, any particulate material build-up on the top part of the nozzle header. Also, header supply tubes 40, 42 need not be cylindrical. These tubes can be any cross-section desired, e.g., square or rectangular.

Elongated nozzle 36 is formed by planar, elongated side members 33, 35, which are connected to the bottom wall 39 of header 38, and which taper toward one another as shown, joining side walls 41, 41' which extend vertically downwardly toward treatment zone 14. The distance from bottom wall 39 to conveyor base member 24 should be from about 4" to 10", providing a rectangular-shaped (or elongated slot) flow path for air flow between 1/16" to 1", preferably ¼" to ¾", in width. The vertical height of the rectangular-shaped flow path should be, in general, about 5 times the width. Thus, the air flow, while perhaps turbulent, will be also directional. Tapered side members 33, 35 can taper at any desired angle, their main function being to provide structural rigidity. The rectangular-shaped orifice for discharge of air should lie in a plane parallel to that of the conveyor base member and from ¼" to 6", preferably 1" to 4", above it. In some cases, satisfactory results will even be accomplished if the plane of the discharge orifice is immersed in the fluidized particles. For example, the static bed of particles may be 2" deep and, in the case of lighter particles the depth may be 3". It will be appreciated that nozzle header 38, side members 33, 35, and side walls 41, 43 can be provided also of somewhat different configuration and of unitary construction. In cross-section this nozzle structure can be somewhat like that of a tear drop, the main consideration being that air be discharged from an elongated slot and that it be directional.

Figure 6:
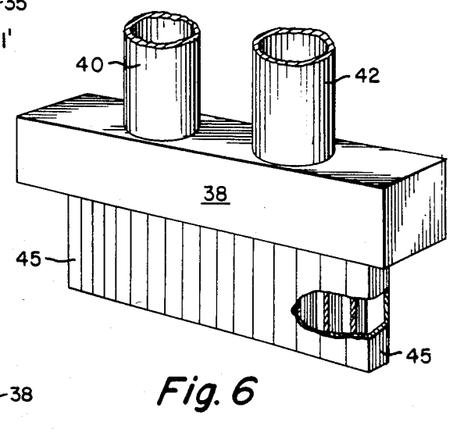
FIG. 6 is a side view showing another elongated nozzle according to the invention.

Although nozzle 36 defining a rectangular-shaped discharge slot is preferred, similar results may be obtained with a somewhat less desirable nozzle construction approximating an elongated rectangular-shaped nozzle. Referring to FIG. 6 of the drawing, there is shown an elongated nozzle construction comprising a header 38 to the bottom wall of which is attached a plurality of elongated tubes 45 each having a square-shaped cross-section and arranged to form a row of tubes. Each tube, as shown by FIG. 6, is in contact with that next adjacent to it and preferably the contacting walls of the adjacent tubes are secured together as by welding or other attachment means. Thus, there is provided a series or row of square-shaped cross-sectional openings, which, taken together, approximate an elongated rectangular-shaped slot. It will be appreciated that such rectangular-shaped slots can be approximated also, but to a somewhat lesser degree, by tubes that are of polygonal cross-section and even if of a circular-shaped cross-sectional shape. With these latter constructions, the main consideration is that the tubes must be aligned in a row extending in the direction of travel. Desirably, the tubes are in contact with one another;

however, in some cases the tubes can be spaced apart from one another, desirably no distance greater than the slot width.

As will be seen from the drawing, particularly in FIG. 2, nozzle support member 44 is supported by horizontal support members 49', 51' provided in housing 30, and provides the bottom for pressure (or gas flow distribution) plenum 46. This chamber, or plenum, is of a box-like shape, extending the length of the treatment zone, and serves to allow gas under pressure to be uniformly distributed to all the headers 38 in the row of nozzle assemblies.

Nozzle assemblies 34 can be provided in housing 30 as removable assemblies, as is shown in FIG. 5, or as a permanent part of the housing 30, as desired. As removable assemblies, the nozzle horizontal support member 44 is slidable back-and-forth on support members 49', 51' provided in housing 30. In the event the nozzle assemblies are fixed in housing 30, the nozzle support members 44, providing the bottom for plenum 46 can be of one-piece construction extending the length of the treatment zone 14. Referring to FIG. 2, it will be seen that the bottom edges of side walls 49, 51 provide line contact with horizontal support members 49', 51' making for not only ease in sliding each assembly in and out of the treatment zone, as desired, but also good sealing engagement. These horizontal support members can, moreover, be provided with low friction surfaces, providing even greater ease in sliding the removable nozzle assemblies. As will be seen more particularly by reference to FIG. 3, laterally extending spacers 53 are provided between each next adjacent elongated nozzle assemblies 34, the purpose for which is to make pressure plenum 46 a sealed chamber, allowing gas discharge therefrom only through supply tubes 40, 42.

As will be appreciated by reference to FIG. 1, a conditioning plenum 48 can be provided in insulated housing 30, above distribution plenum 46, in which air or other gas to be supplied to treatment zone 14 is conditioned, as by, for example, heaters 50, located at each end of plenum 48. The conditioned air is then transferred under the desired pressure to distribution plenum 46 as indicated by the arrows, by blowers 52 located at each end, and to the far side wall in the drawing, of the plenum 48. It will be understood, however, that the gas need not be conditioned by heating. It can be otherwise conditioned, e.g., by cooling, or by addition of water thereto, according to known techniques.

As will be better appreciated by reference to FIG. 2, vertically disposed side walls 54, 56 extend downwardly from the housing and terminate in horizontally disposed flanges 55, 57 respectively, which extend outwardly from the treatment zone, and to which are attached, respectively, friction seal members 59, 61, the purpose for which will be made clear hereinafter, if not already obvious. These seal members 59, 61 can be of various plastic or elastomeric materials conventionally used for the intended purpose such as polytetrafluoroethylene ("Teflon"), and, like side walls 54, 56, extend the length of treatment zone 14. Seal members 59, 61 make contact with, and are biased against, the inside surfaces of vertically disposed flanges 63, 65, respectively, of the respective inclined side walls 26, 28 of conveyor pan 18. Flanges 63, 65, like seal members 59, 61, extend the length of the treatment zone. Thus, as will be appreciated, when conveyor 20 reciprocates back and forth, flanges 63, 65 are in frictional, sealing contact with seal member 59, 61, providing treatment zone 14 as part of a closed circulating gaseous flow system.

The housing surmounting treatment zone 14 is provided with at least one elongated exhaust port or slot, as denoted by reference numerals 58, 60 at the top of the closed treatment zone 14, for exhausting gas therefrom as indicated by the arrows in the drawing. These exhaust ports 58, 60 in turn communicate with series flow paths of exhaust chambers 62, collection ducts 64, and transfer conduits 66 at the top of the housing 30 that are connected to conventional cyclones 68. The gas from cyclones 68 is returned to housing 30 through ducts 70, as shown by the directional arrows in FIG. 1 of the drawing, for flow into the conditioning plenum 48 for conditioning by heaters 50 and is then transferred by blowers 52 to pressure plenum 46.

The particle treatment apparatus 10, shown in FIG. 2, differs somewhat from that shown in FIG. 1. Thus, in FIG. 1, housing 30 accomodates the entire particle treatment system, including the air flow circulation system and the conditioning plenum. Housing 30' (FIG. 2), on the other hand, provides only for the pressure or distribution plenum 46 and for exhausting air from the treatment zone. Air flow circulation apparatus and conditioning means are provided external to housing 30'. Nevertheless, both housing 30 and 30' surmount treating zone 14 providing a closed treating zone as above disclosed. Thus, as shown in FIG. 2, air is exhausted from treatment zone 14, as shown by the arrows, through elongated exhaust port 58 and out of housing 30' through collection duct 64 which extends above housing 30', as is shown, and is provided with flange 72 for connection with a transfer duct (not shown—FIG. 2) such as that identified earlier by reference numeral 66 for transferring the exhausted air to cyclones (not shown in FIG. 2). This air, in turn, from which airborne particles have been removed by the cyclones, is then transferred from the cyclones through ducts (not shown) to a conditioning plenum (not shown) located externally to housing 30', such as that earlier disclosed. Conditioned air, or other gas, is then transferred under pressure by a fan (not shown) through a suitable conduit (not shown) which is connected to flange 74, on circular-shaped air supply conduit 76 which is connected to, and integral with, the top of distribution (or pressure) plenum 46. Although only one exhaust port, as indicated by reference numeral 58, is shown in FIG. 2, it will be appreciated that an exhaust port can be provided along each side of treatment zone 14, if desired. This will depend somewhat not only on the width of the treatment zone but also on the desired volume of air to be handled. Where the width of treatment zone 14 is greater than about 18", an exhaust on both sides will be, generally, found more desirable.

It will be appreciated that whether the particle treatment apparatus used in the practice of the invention is that of the construction and configuration shown in FIG. 1 or that in FIG. 2, its operation will be, in general, the same. Air, for example, is conditioned, as by heating, and heated air is then transferred by a fan under pressure to the distribution plenum 46; hence, it passes to the header supply tubes 40, 42 to header 38, and is discharged directly downwardly and out through rectangular-shaped slots 37 against conveyor base member 24.

The row of elongated nozzles 36 provide a high velocity air flow in an elongated path that agitates and fluidizes the particles 13 being conveyed through the treatment zone, while at the same time conditioning them, for example, as by drying, if the air has been previously conditioned by heating.

The air flow desired from the elongated nozzles 36 will depend to some extent upon the particulate material being treated, but need be such as to adequately fluidize the particles processed. In general, satisfactory results will be obtained where the air supply volume is between 50 to 1000 ft$^3$/min/ft$^2$ base member area per nozzle preferably between 200 to 600 ft$^3$/min/ft$^2$, and the slot exit velocity is from 500 ft/min. to 15,000 ft/min., preferably from 2,000 ft/min. to 12,000 ft/min. Stated in different parameters, the projection density (slot area/base member area) for each elongated nozzle 36 should be from about 0.01 to about 0.10, preferably from about 0.02 to about 0.06.

As indicated in FIG. 2, the gaseous flow from the rectangular-shaped discharge orifice 37 is directly downwardly against the imperforate base member 24 of the pan conveyor 18 through the bed of particulate material and is deflected outwardly, as indicated by the arrows toward the upward inclined side walls 26, 28 of the conveyor. These inclined side walls, defining the lateral extremes of the treatment zone 14 cause the particles to be returned inwardly toward the nozzle 36, resulting in more efficient fluidization of the bed of particles. The thicker the bed of particles, and the greater the particle density, the greater the air velocity need be, in general, to obtain, and maintain, the desired fluidization. When the temperature of the gas, for example, air, is different from that of the particles, a heat exchange takes place and the particles may either be cooled or dried (e.g., have moisture removed) by their contacting relation with the gaseous stream.

The temperature of the gas emanating from different nozzle assemblies in the row thereof can be varied somewhat, if desired, according to usual techniques, but the weight of gas issuing from each nozzle generally is uniform unless the density of the particles changes unduly along the path of advance due to the treatment, in which case equal amounts of fluidization may be maintained throughout the treatment zone with gas at the same temperature or with temperature change in the gas of the same velocity, or both, to compensate for a change in particle density.

As will be seen by reference to FIGS. 1 and 2 of the drawing, nozzle assemblies 34 are so located by the housing supporting them not only to provide the elongated nozzles in a straight line extending the length of treatment zone 14, but also to provide each elongated nozzle 36 intermediate vertically inclining walls 26, 28. Thus, the air flow toward each inclining side wall 26, 28 will be substantially the same, providing an equal amount of fluidization on each side of the elongated nozzle. Nevertheless, the nozzles need not be so located in all situations. In some cases, for example, where friable particulate material is being treated, such as rice crispies and the like cereal products, this manner of construction may cause too much impact, resulting in undue product damage. That being the case, and depending somewhat on the width of the treatment zone 14, it may be more desirable to locate two nozzles laterally across the treatment zone, and at its extremities.

As will be appreciated, the velocity of the gas being exhausted from treatment zone 14 must be substantially decreased, to provide that the fluidized particles will fall back toward the layer of particles, rather than being entrained by the exhausting gases and carried into the exhaust system. Thus, there must be a sufficiently large enough cross-sectional area provided between next adjacent header supply tubes in the row of nozzle assemblies to allow gas transfer from one side of the treatment zone 14 to the other as to permit a rather large pressure drop. The cross-sectional area of exhaust air space 77 (FIG. 3) will be determined not only by the linear distance "d" between next adjacent tubes but also by the length 1 of those tubes. In any particular case, these dimensions will be determined in large part by the discharge velocity required for the fluidization and the volume of air discharged per minute from the elongated nozzles. Whatever area is provided, in any particular case, will be determined by the velocity reduction that is needed to prevent undue particle entrainment in the exhaust gases. Those relatively few particles that are entrained will, of course, be removed by the cyclones.

Referring to FIG. 3, there is shown in air supply conduit 76, a damper 78 of conventional construction, which may be controlled automatically according to conventional techniques, for dampening the flow of air, as desired, to distribution plenum 46. The gaseous flow can be dampened even further and better distribution thereof provided in distribution plenum 46, as indicated by the arrow in the drawing, for providing even flow to each of the nozzle supply tubes 40, 42 by the provision of a splash plate 80 directly below the damper 78, and in the incoming high velocity stream of air. Similar laterally extending splash plates 82 are provided, as needed, in nozzle headers 38 to further drop the pressure of the incoming air. As shown in FIG. 3, a flow restriction barrier 84 can be provided in nozzle header 38 to better provide air of uniform velocity being emitted from the elongated nozzle 36. Such a barrier can be a perforated plate, or a large mesh screen, either of which is conventionally used for this purpose. As will be appreciated by those skilled in the art, splash plates 80, 82, not only kill the kinetic energy of the incoming gaseous flow but also prevent that flow from pounding right through the nearest supply tubes 40, 42 and out only a portion of nozzle 36. These splash plates are planar, imperforate members which are secured at each of their ends to the plenum walls or nozzle header.

Figure 4:
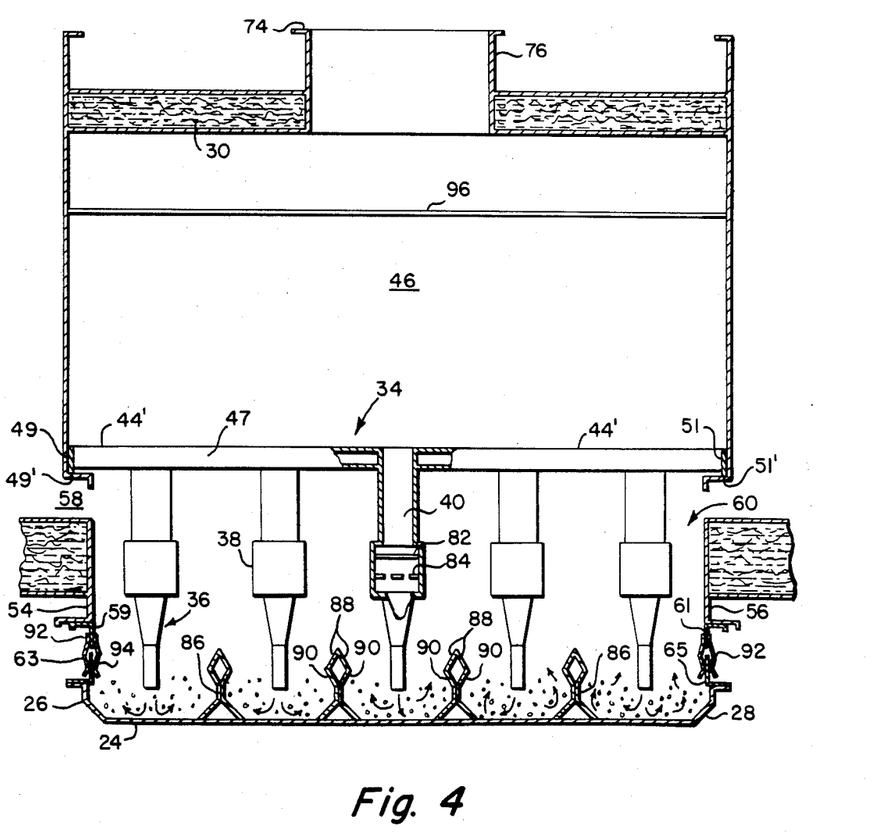
FIG. 4 is a view in cross-section showing apparatus such as is shown in either FIGS. 1 or 2, but with a wider treatment zone, modified to accomodate a plurality of rows of elongated nozzles.

Referring to FIG. 4, there is disclosed a further embodiment of the invention wherein a plurality of rows of nozzle assemblies 34 are provided in the treatment zone 14, to provide the desired particle fluidization and particle treatment. The number of rows of elongated nozzles 36 needed in any particular situation will depend on a number of factors, including the characteristics of the particles processed, but primarily upon the width of the treatment zone 14 desired, and the width of the elongated nozzle. In general, a nozzle having a width as above set forth can provide satisfactory particle fluidization in a treatment zone having a width of from only about 6" to 24". The greater the air flow velocity, in general, the wider can be the conveyor for any particular width of elongated nozzle.

As will be seen from FIG. 4, the treatment zone 14 therein is divided into five lateral divisions by the vertically disposed dividers or particle restraining members 86 which, as will be appreciated, serve the same function as the upwardly inclining walls 26, 28 of the conveyor pan, and are provided essentially with the same upwardly inclining surface configuration, curving inwardly toward the respective row of nozzles. As will be appreciated, each divider 86 extends at least the length of the treatment zone 14 and may be formed separately from the conveyor pan and subsequently attached by suitable means to base member 24. Each two adjacent dividers 86 are connected together in back-to-back relationship, as shown, by welding or other conventional means. Nevertheless, the conveyor pan can be manufactured so that these dividers are provided integral to the base member, if desired, during the manufacturing operation. As disclosed earlier, the nozzles 36 need not be located intermediate the extremities of the treatment zones shown. The particular location as disclosed earlier will depend somewhat on the zone width and the particular material involved.

Dividers 86, as will be appreciated, need not be provided with upper, outwardly inclining surface 88, to accomplish the desired turning of particles 13 back inwardly toward the elongated nozzle. This feature is accomplished by the inwardly inclining surface 90; however, greater stability is provided by the diamond-shaped cross-section formed when two dividers are joined together as shown in the drawing.

In FIG. 4, seal clips 92, having a diamond-shaped cross-section, as shown, are provided attached to seal members 59, 61, which in turn are secured respectively to the side walls 54, 56. Thus, flanges 63, 65 are held in sliding frictional contact according to usual techniques, as the conveyor reciprocates back and forth, providing a sealed treatment zone 14. The diamond-shaped cross-section of clips 92 provides an inwardly inclining surface 94, like surface 90 which aids in curving the air flow and particles back to the center of the treatment zone.

As earlier disclosed with respect to the description of FIG. 3, distribution plenum 46 of the apparatus disclosed in FIG. 4 can be provided with a suitable, laterally disposed, flow barrier to reduce the gas pressure as desired. Such a barrier is denoted by reference numeral 96, which barrier can be a solid splash plate, as earlier disclosed or, in some cases, a wide mesh wire screen or the like, also conventionally used.

The nozzle assemblies 34 in FIG. 4 will need be provided with a nozzle support member 44 of good structural rigidity, to maintain and support the nozzle headers 38, etc. In general, adequate strength will be provided where end walls 43, 47 have a width of from 2" to 4". These end walls will be joined at their ends to the respective ends of side walls 49, 51, providing good structural rigidity.

Figure 7:
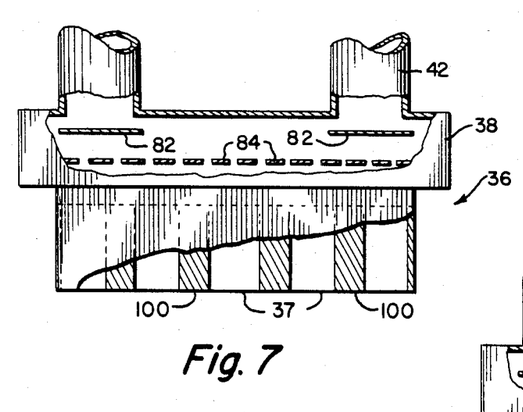
FIG. 7 is a view in section showing a nozzle like that in FIG. 5 but whose discharge orifice is modified to reduce the gaseous flow volume.
Figure 8:
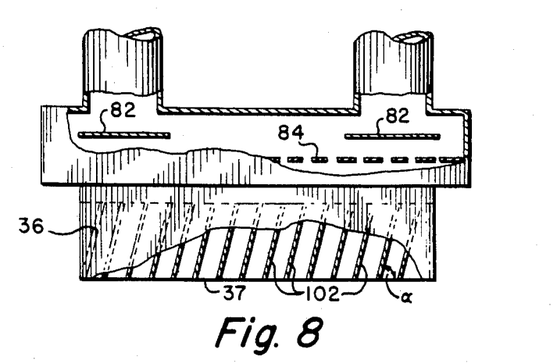
FIG. 8 is a view in section showing an elongated nozzle like that in FIG. 5 but modified to include forward thrust vanes.

Turning now to FIGS. 7 and 8 of the drawing, there are shown further embodiments of an elongated nozzle, in accordance with the invention, suitable for use in certain applications. Nozzle 36, as shown in FIG. 7 is provided with a plurality of spaced-apart spacers 100 located in the rectangular-shaped discharge slot. Thus, the slot is open for the discharge of air flow only between next adjacent spacers, resulting in a desired reduction of air volume. The use of such spacers 100 can result in standardization and savings in the manufacture of the elongated nozzles in that all such nozzles can be manufactured of the same length. The nozzles can then be custom designed for any particular air volume needed in a particular application by use of spacers of suitable size and number to block off the discharge slot. These spacers 100 should be uniformly spaced along the slot length to provide best results, and can be provided as removable spacers, if desired.

In FIG. 8 there is shown an elongated nozzle 36 provided with a plurality of vanes 102 located in the rectangular-shaped discharge slot 37. These vanes which are of a relatively thin planar construction are secured in the slot and make an angle "α" from 2° to 10° with respect to the vertical, as shown in the drawing. Thus, if the vanes are angled toward the direction of particle travel, the discharge flow of air from the nozzle, though primarily lateral to the elongated slot, will impart a forward thrust to the particle travel. It will be appreciated that a similar result will be obtained by canting the spacers 100 (FIG. 7) forward or backward, depending on whether it is desired to increase or retard the flow of particles.

Although not specifically shown in the drawing, it will be appreciated that at the feed end of treatment zone 14 there is provided a hopper for feeding particulate material 13, at a metered rate, according to known and conventional techniques. The invention has been disclosed herein with particular reference to an oscillating conveyor; however, it will be appreciated that a continuous conveyor can be used instead if desired, such as is disclosed in U.S. Pat. No. 4,109,394, the disclosure of which is herein incorporated by reference. Whichever manner of conveyor is used in the practice of the invention, the main consideration is that it provide an imperforate member against which the gaseous flow is directed. In the event that a continuous conveyor is used, the material of the conveyor belt will be determined, in part, by the particulate material being processed; however, it may be of elastomeric material or metal, both of which are conventionally used.

In some applications, it may be desirable to vent the gas exhausted from the treatment zone to atmosphere, in which a case the air circulating system can be dispensed with, in part. Nevertheless, it will still be necessary to provide conditioning of the gas used, and for transfer of the conditioned gas to the distribution plenum and nozzles. It will be appreciated that, in the closed system, the treatment zone, etc. and all connections must be sealed according to usual techniques, to prevent escape of gas.

As disclosed more particularly in FIG. 3, there is a gap between each next adjacent elongated nozzle 36 in a row; however, no gap need actually be provided. The nozzles can be in contact if desired. In the case of a removable nozzle assembly, the wider the treatment zone, in general, the shorter the nozzles's length, in order to be able to man-handle the assemblies. Nevertheless, the length, and therefore the weight, is of much less concern where these assemblies are handled by overhead cranes and the like.

Although a divider 86 is shown in FIG. 4 to be located between next adjacent lateral rows of nozzles 36, this may not be necessary in all cases, and will depend somewhat on the width of conveyor pan 24, as well as on the particulate material being processed. For example, where the lateral width is from 6"-12", and a single row of nozzles is provided, that row will generally best be located intermediate the edges of the treatment zone. Nevertheless, where the conveyor pan width is from 18"-24", two laterally disposed rows of nozzles will generally be found necessary, and the location of the rows laterally will depend somewhat on the friabity characteristics of the material being processed. In the case of a friable product, as disclosed earlier, the nozzles will be located in parallel rows along the outer edges of the conveyor pan, and, most importantly, a divider may not be found necessary to result in the desired fluidization. Alternatively, however, and with less friable product, the two rows of nozzles will be located at the quarter-points across the conveyor, with a divider located down the mid-point line. As the width of the conveyor pan increases, it generally will be found desirable to locate dividers between next adjacent rows of nozzles, a nozzle being located laterally for each 6"-12" width segment.

With some particulate material, it may be desirable to operate the apparatus herein disclosed as a batch processor, rather than continuously, e.g., where long drying times are required as in the case of gun powder. This can be accomplished according to techniques now known by providing a gate or dam at the conveyor outlet, and with the conveyor turned off. Thus, the particulate material can be processed for any residence time needed to accomplish the desired results.

The materials of construction for the elongated nozzles, housing, ductwork, conveyor pan, etc. used in the practice of the invention can vary, depending upon the particulate material being processed. Examples are stainless steel, mild steel, and aluminum. The choice in any particular situation can be readily determined by those skilled in the art.

It should be understood that the embodiments described herein are merely exemplary of the preferred practice of the invention and that various modifications and changes may be made in the arrangement and details of construction of the particular embodiments described herein without departing from the spirit and scope of the present invention.

The embodiments of the invention in which an exclusive property or privilege is claimed are defined as follows.

What I claim is:

1. Apparatus for treating particulate material as the particles are advanced continuously through a treatment zone comprising:
   (a) structure defining an elongated treatment zone having a feed end and a discharge end including a conveyor for transport of particulate material through said treatment zone, said conveyor defined by an imperforate, horizontally disposed base member for containment of said particles;
   (b) a plurality of nozzle assemblies each comprising an elongated nozzle terminating in a rectangular-shaped slot located adjacent to and above said imperforate base member, said plurality of nozzle assemblies providing at least one row of nozzle assemblies located in serial fashion along said treatment zone from said feed end to said discharge end, said elongated nozzle in each said assembly extending in its lengthwise direction in the lengthwise direction of the treatment zone, the rectangular-shaped slots in each said elongated nozzle terminating in the same horizontal plane above the said imperforate base member;
   (c) a distribution plenum being located above said at least one row of nozzle assemblies for providing a flow of conditioned gas to each said nozzle assembly in said at least one row; and
   (d) means to cause conditioned gas to flow to said distribution plenum and to each said elongated nozzle and out said elongated rectangular-shaped slots for fluidizing the particles being transported while simultaneously conditioning those fluidized particles, and to cause said gas to be exhausted from the treatment zone.

2. Apparatus for treating particulate material as the particles are advanced continuously through a treatment zone according to claim 1 wherein each said elongated nozzle assembly further comprises a horizontally disposed elongated nozzle header connected to said elongated nozzle for providing a gaseous flow discharge of uniform velocity from said rectangular-shaped slot.

3. Apparatus for treating particulate material as the particles are advanced continuously through a treatment zone according to claim 1 wherein the said plurality of nozzle assemblies are removably located in the said elongated treatment zone, the elongated nozzle in each said nozzle assembly being defined by an elongated flow convergence section and an elongated discharge section integral therewith, said flow convergence section being defined by elongated planar side walls which taper toward one another and define a rectangular-shaped opening, and said elongated discharge section being defined by parallel spaced-apart side walls which terminate in and define the said rectangular-shaped slot.

4. Apparatus for treating particulate material as the particles are advanced continuously through a treatment zone according to claim 2 wherein the said nozzle header is defined by a square cross-sectional shape.

5. Apparatus for treating particulate material as the particles are advanced continuously through a treatment zone according to claim 2 wherein said nozzle assembly further comprises first and second vertically disposed, spaced-apart, header supply conduits each connected at one end to said nozzle header and at the other end in operative association with the said distribution plenum.

6. Apparatus for treating particulate material as the particles are advanced continuously through a treatment zone according to claim 5 wherein at least one inlet is provided in said distribution plenum for the introduction of conditioned gas thereto.

7. Apparatus for treating particulate material as the particles are advanced continuously through a treatment zone according to claim 6 wherein a plenum is located above said distribution plenum for the conditioning of a gaseous flow.

8. Apparatus for treating particulate material as the particles are advanced continuously through a treatment zone according to claim 1 wherein said apparatus further comprises:
   (e) housing for location of said distribution plenum and said row of elongated nozzles, said row of elongated nozzles being so located by said housing as to be intermediate laterally a predetermined lateral extent of the imperforate base member of the conveyor;
   (f) an exhaust system being provided in said housing comprising at least one elongated slot extending lengthwise along at least one side of said treatment zone and communicating therewith at the top whereby gas can be exhausted from the said treatment zone.

9. Apparatus for treating particulate material as the particles are advanced continuously through a treatment zone according to claim 8 wherein at least one inlet is provided in the top of said housing in communication with said distribution plenum for providing a flow of conditioned gas thereto.

10. apparatus for treating particulate material as the particles are advanced continuously through a treatment zone according to claim 9 wherein a first horizontally disposed splash plate is provided in said distribution plenum adjacent said at least one inlet whereby the Kinetec energy of the gaseous flow into the distribution plenum will be reduced and that gaseous flow distributed throughout the said distribution plenum.

11. Apparatus for treating particulate material as the particles are advanced continuously through a treatment zone according to claim 10 wherein said conveyor is an oscillating conveyor defined by said imperforate base member and upwardly inclining sides on each side thereof extending the length of the conveyor which define the said predetermined lateral extent of the imperforate base member.

12. Apparatus for treating particulate material as the particles are advanced continuously through a treatment zone according to claim 11 wherein at least one elongated vertically disposed restraining member extending the length of said conveyor and being parallel with said upwardly inclining sides is located between the said sides whereby the conveyor is divided into at least two elongated, laterally-adjacent conveyor divisions for transport of particulate material, the said at least two conveyor divisions each defining the said predetermined lateral extent of the imperforate base member for a row of elongated nozzles, and a row of serially located elongated nozzles being located above each said laterally-adjacent conveyor division.

13. In a system for the treatment of particulate material comprising a conveyor having a horizontally disposed imperforate base member for transporting particulate material through a treatment zone and a gas flow system for placing particles on the conveyor in fluidized condition as they move through the said treatment zone, the improvement which comprises at least one row of nozzle assemblies disposed in serial fashion each defining an elongated nozzle terminating in an elongated slot at least approximately a rectangular-shaped slot adjacent to and above said imperforate base member whose lengthwise direction extends in the direction that said fluidized particulate material is being transported through the treatment zone for projecting a gaseous stream downwardly against the imperforate base of the conveyor whereby the particles on the base member are fluidized.

14. In a system for the treatment of particulate material according to claim 13 wherein each said nozzle terminates in a rectangular-shaped slot in the same horizontal plane parallel to that of the said horizontally disposed imperforate base member.

15. In a system for the treatment of particulate material according to claim 14 wherein the width of the said rectangular-shaped slot is between 1/16" to 1".

16. In a system for the treatment of particulate material according to claim 15 wherein the distance of the horizontal plane defined by the rectangular-shaped slots to the imperforate base member is between ¼" to 6".

17. In a system for the treatment of particulate material according to claim 13 wherein the projection density provided by each said at least one row of nozzle assemblies is from 0.01 to 0.10.

18. A removable nozzle assembly for use in a system comprising an elongated treatment zone for treatment of particulate material wherein a gas flow is projected downwardly against an elongated imperforate base member for the fluidization of the particulate material supported by the said base member, said nozzle assembly comprising a horizontally disposed nozzle support member for removably supporting the nozzle assembly above the said imperforate base member and at least one elongated horizontally disposed nozzle defining an elongated discharge orifice connected to said nozzle support member, said at least one elongated nozzle being so oriented with respect to the said support member as to provide the elongated discharge orifice thereof in the direction of the elongated treatment zone.

19. A removable nozzle assembly for use in a system comprising an elongated treatment zone for treatment of particulate material wherein a gas flow is projected downwardly against an elongated imperforate base member for the fluidization of a particulate material supported by the said base member, according to claim 18 wherein the said nozzle assembly comprises only one elongated horizontally disposed nozzle.

20. A removable nozzle assembly for use in a system comprising an elongated treatment zone for treatment of particulate material wherein a gas flow is projected downwardly against an elongated imperforate base member according to claim 19 wherein said nozzle assembly further comprises an elongated horizontally disposed header connected to said nozzle, and two spaced-apart, vertically disposed header supply tubes, each having an inlet end and an outlet end, and said header is operatively connected to said support member by said supply tubes.

21. A removable nozzle assembly according to claim 20 wherein said header and nozzle are of unitary construction and, in cross-section, approximate the shape of a tear drop.

22. A removable nozzle assembly according to claim 20 wherein said header comprises a bottom wall and is defined by a square cross-sectional shape and said nozzle is defined by two, planar, elongated members connected to and extending downwardly from said header in converging relationship, and terminating in a rectangular-shaped opening, and planar, spaced apart, elongated side walls extending vertically downwardly from, and interconnected to said converging members and defining a rectangular-shaped orifice for discharge of the gas flow.

23. A removable nozzle assembly according to claim 22 wherein the said elongated header is of a somewhat longer length than the said elongated nozzle.

24. A removable nozzle assembly according to claim 23 wherein the said supply tubes are of cylindrical cross-section.

25. A removable nozzle assembly for use in a system comprising an elongated treatment zone for treatment of particulate material wherein a gas flow is projected downwardly against an imperforate base member according to claim 18 wherein the horizontally disposed nozzle support member is defined by a planar, horizontally disposed member and vertically disposed side and end walls interconnected together at their ends extending vertically downwardly from said horizontally disposed member, said side walls extending downwardly slightly further than said end walls whereby a line contact is provided for contact of the bottom of the said side walls of the removable nozzle assembly with horizontal support members in the said treatment zone for the nozzle assembly thereby facilitating the sliding movement of the nozzle assembly when and as desired on the support members in removal of the nozzle assembly from the treatment zone and good sealing engagement between the removable nozzle assembly and said support members therefor.

26. A removable nozzle assembly according to claim 22 wherein a laterally extending horizontally disposed splash plate is provided in said header located at the discharge and of each header supply tube for dropping the pressure of the gas discharging from the header supply tube into the header.

27. A removable nozzle assembly according to claim 26 wherein a horizontally disposed flow restriction barrier is provided in said header located in a plane between that defined by the said splash plates and the plane defined by the said bottom wall of the header whereby the velocity of the gas flow discharged from the elongated nozzle is maintained more uniform.

28. A removable nozzle assembly according to claim 27 wherein the said flow restriction barrier is a perforated plate.

29. In a system for the treatment of particulate material comprising a conveyor having a horizontally disposed imperforate base member for transporting particulate material through a treatment zone and a gas flow system for placing particles on the conveyor in fluidized condition as they move through the said treatment zone, the improvement which comprises at least one row of nozzle assemblies located in serial fashion along said treatment zone adjacent to and above said imperforate base member each said nozzle assembly defining an elongated nozzle terminating in a rectangular-shaped slot parallel to the said imperforate base member and whose lengthwise direction extends in the direction that said fluidized particulate material is being transported through the treatment zone for projecting a gaseous stream downwardly against the imperforate base of the conveyor whereby the particles on the base member are fluidized, the said rectangular-shaped slot having a width of between 1/16" to 1", and the vertical distance from said rectangular-shaped slots to said imperforate base member being between ¼" to 6".

* * * * *